United States Patent
Hill et al.

[11] Patent Number: 5,154,402
[45] Date of Patent: Oct. 13, 1992

[54] VEHICLE SEAT SUSPENSION

[75] Inventors: Kevin E. Hill, Mequon; Charles G. Mwakisunga, Milwaukee, both of Wis.

[73] Assignee: Milsco Manufacturing Company, Milwaukee, Wis.

[21] Appl. No.: 698,283

[22] Filed: May 10, 1991

[51] Int. Cl.5 ............................................. A47G 7/14
[52] U.S. Cl. .................................. 267/133; 248/567; 248/429; 297/326; 297/344
[58] Field of Search ............... 267/131, 133; 248/419, 248/429, 157, 585, 371, 567; 297/325, 326, 344, 302, 308, 330

[56] References Cited

U.S. PATENT DOCUMENTS

| | | | |
|---|---|---|---|
| 3,006,593 | 3/1957 | Plafe et al. | 246/567 X |
| 3,339,906 | 9/1967 | Persson | 267/131 |
| 3,572,828 | 3/1971 | Lehner | 297/308 |
| 3,700,203 | 10/1972 | Adams | 248/419 |
| 3,917,209 | 11/1975 | Adams | 248/567 |
| 5,076,528 | 12/1991 | Van Daser | 248/419 |

Primary Examiner—Robert J. Oberleitner
Assistant Examiner—Lee W. Young
Attorney, Agent, or Firm—Nilles & Nilles

[57] ABSTRACT

A seat suspension for resiliently mounting a seat for vertical floating movement between upper and lower positions comprising a base part mountable on a vehicle and a seat support part on which the seat is mounted. The base part has lower front and rear pivot axes and the seat support part has upper front and rear pivot axes that are vertically spaced apart. Front and rear links are pivotally interconnected respectively between the upper front and lower front pivot axes and the upper rear and lower rear pivot axes. An extension spring is located between the base part and the seat support part and is oriented so that its line of force is generally horizontal.

11 Claims, 8 Drawing Sheets

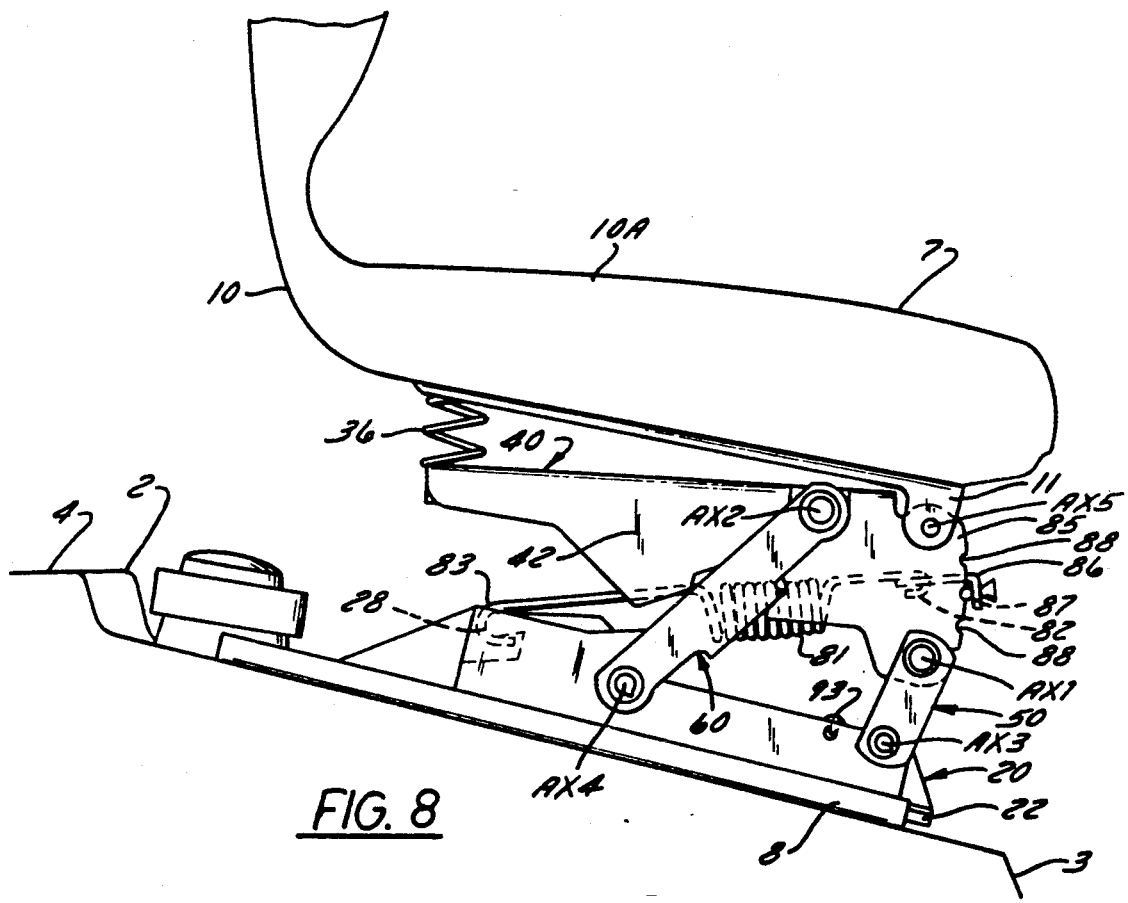

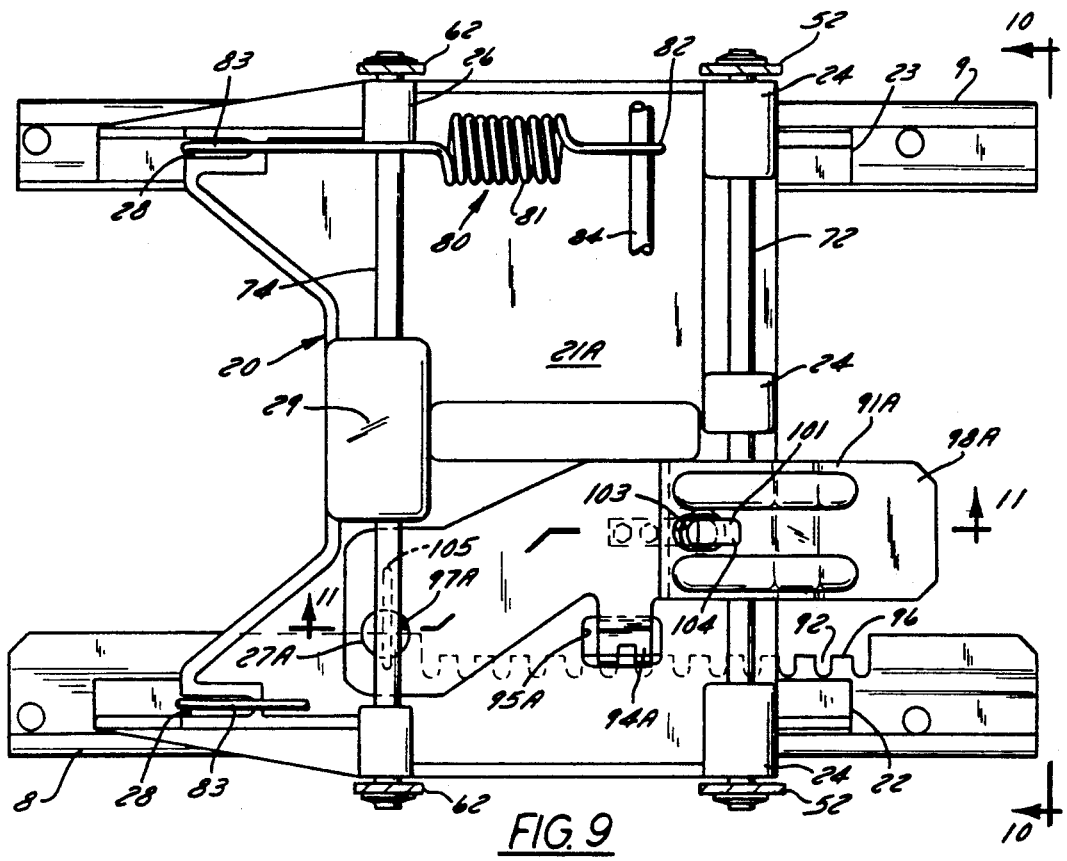
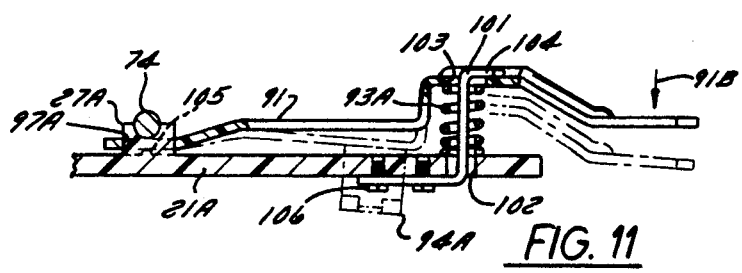
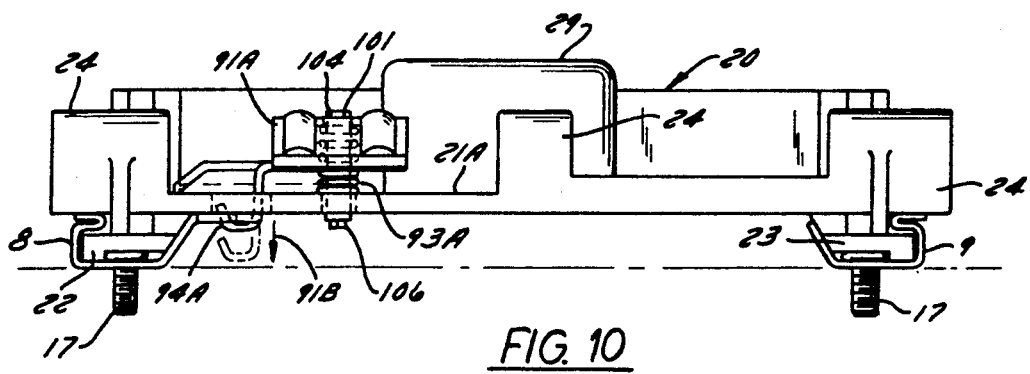

VEHICLE SEAT SUSPENSION

BACKGROUND OF THE INVENTION

1. Field of Use

This invention relates to a seat suspension for resiliently mounting a seat on a support frame of a vehicle and more specifically to an improved seat suspension system ergonomically designed to reduce repetitive motion induced injury.

2. Description of the Prior Art

Most off-highway vehicles such as tractors and the like have an unsprung chassis. It is conventional practice to mount a seat for such vehicles on some type of resilient suspension means to permit the seat to have a range of floating up and down motion to minimize jolting of the vehicle operator.

In normal operation of the vehicle this floating will be a repetitive up and down motion. Seat suspensions have also included a dampening means designed to soften such repetitive motions, but dampening means do not prevent such motions. Medical experts have learned that seemingly innocuous repetitive motions can result in strains that take an excruciating toll on the human body in the form of cumulative trauma. Such innocuous movements occurring repeatedly may lead to leg, back, shoulder and neck pains or even chronic injury.

Many of the prior art resilient seat suspensions use upper and lower spaced parallel links to interconnect a base part of the seat suspension with a vertically movable seat support to maintain the actual seating surface at a preselected uniformly constant attitude relative to horizontal throughout the range of vertical float. Typical examples of upper and lower parallel link seat suspensions for maintaining the seat surface at one attitude are shown in U.S. Pat. No. 3,335,996 issued Aug. 15, 1967 to G. O. Hall et al; U.S. Pat. No. 3,493,211 issued Feb. 3, 1970 to C. J. Barecki et al; U.S. Pat. No. 4,222,555 issued Sep. 16, 1980 to S. H. Eimen; and U.S. Pat. No. 3,917,209 issued Nov. 4, 1974 to A. J. Adams. The floating action is usually provided by a vertically orientated spring means and the last-mentioned patent to Adams, for example, discloses a vertically orientated compression spring between the upper link and the base part to resiliently support the seat. The previously mentioned U.S. Pat. No. 3,335,996 uses an air spring between the base part and the movable seat support to achieve the same purpose. All of these seat suspensions maintain the seating surface at a uniformly constant attitude relative to horizontal. The use of a vertically orientated spring increases the overall height of the suspension and makes installation more difficult on small vehicles such as lawn and garden tractors where very limited vertical height is available for the seat assembly.

It is also known to provide a seat suspension with upper and lower links that are nonparallel and of unequal length as shown in U.S. Pat. No. 3,572,828 issued Mar. 30, 1967 to Wilhein Lehner; and U.S. Pat. No. 4,083,599 issued Apr. 11, 1978 to E. J. Gaffney. In the nonparallel linkage of U.S. Pat. No. 3,572,828 a vertical extension spring is connected to a link that has a floating pivot connection so while the seat will float vertically the preselected constant attitude of the seating surface does not change. In U.S. Pat. No. 4,083,599 the seat does not float and the upper and lower links only cause the seat to tilt and change the attitude of the seating surface when a power ram is extended or retracted to assist an occupant in leaving or sitting down on the chair.

In a resiliently suspended seat, the vertical distance between the occupant's knees and feet remains constant regardless of the vertical position of the seat as it floats. With floating suspension systems as above discussed, the attitude of the seating surface relative to horizontal remains constant as the seating surface moves up or down, and therefore the seating surface will not fully support the occupant's thigh between the hip and knee throughout the full range of seat float.

The prior art seat suspensions also normally make provision for a front to rear position adjustment of the seat assembly as a unit by releasably mounting a base part of the seat suspension on tracks. The seat suspension normally includes a latch lever that is selectably moved to release the seat base to slide on the tracks. Heretofore, latch levers have used a mounting assembly that is unduly complex requiring the manufacture of a plurality of parts which adds to the expense. Further, the final assembly of the latch lever and its mounting assembly on the base part of the seat suspension has been labor intensive and expensive.

SUMMARY OF THE INVENTION

The present invention provides an improved seat suspension of simple, compact, rugged design and construction that automatically changes the attitude of the seating surface as it floats to constantly support the occupant's thighs and minimize the effect of repetitive motion while reducing the overall vertical height of the seat suspension. The seat suspension also includes a simplified fore and aft latch release lever that is mounted and retained on the base part by the components of the suspension system. Assembly of the suspension components will automatically secure the latch lever to virtually eliminate assembly time and significantly reduce costs. The spring for providing the floating action is disposed between the base part and movable seat support part substantially parallel to a horizontal plane to reduce the overall height and the front to rear length to thereby provide an extremely compact seat suspension.

In accordance with one aspect of the invention there is provided a seat suspension for resiliently mounting a seat on a vehicle of the type that has a front, a rear and a horizontal plane of reference. The seat suspension is mounted on the vehicle to permit the seat which is supported thereon to be movable vertically relative to the horizontal plane of reference between an upper position that lies in an upper plane of reference and a lower position lying in a lower plane of reference. More specifically, the seat suspension includes a base part having lower front and rear fixed pivot axes and a mounting means for securing the base part on the vehicle. The seat suspension also includes a seat support part located above the base part which has upper front and rear fixed pivot axes vertically spaced apart from each other. The vehicle seat is mounted on the seat support part and has a seat attitude relative to the horizontal plane of reference. Front and rear links are pivotally interconnected respectively between the upper front and lower front pivot axes and the upper rear and the lower rear pivot axes to cause the upper and lower planes of reference to converge at an apparent pivot point lying forward of the upper and lower front pivot axes and vary seat attitude about this apparent pivot as the seat travels between the upper and lower positions. A biasing means in the form of an extension spring having front and rear ends is connected between the base part and the seat support part. Preferably the connection of the front end of the spring will be intermediate the vertically spaced upper front and rear pivot axes and the line of force of the spring will be substantially parallel to the horizontal plane of reference.

The seat support part has an abutment means and the rear link means includes a stop element which is contactable with the abutment means to define the upper position of the seat. Preferably the abutment means will include spaced apart upper and lower abutments with the lower abutment being contactable with the stop element to define the upper position of the seat and the upper abutment contactable with the stop element to define the lower position of the seat. The front and rear links are in nonparallel relation to each other with the rear link having an overall length between the upper rear and the lower rear pivot axes that is greater than the length of the front link. The extension spring is operatively mounted between the base part and the seat support part with a line of force that traverses across the longer rear link means, and preferably the line of force of the extension spring will be substantially parallel to the horizontal plane of reference when the seat is in the lower position.

Specifically the seat support part includes an upper plate member and spaced apart side plates with the upper front and rear fixed pivot axes comprising upper front and rear pivot shafts mounted to extend between the mentioned spaced apart side plates. The seat support side plates will have the abutment means thereon and the rear link stop element will be contactable with the abutment means on the side plates.

The base part includes a lower plate member having a releasable front to rear position adjusting means which will permit front to rear movement of the base part and a latch arm pivot member. The lower front and rear fixed pivot axes may comprise lower front and rear pivot shafts with at least one of the pivot shafts positioned above the lower plate to define a latch arm receiving space between the shaft and the lower plate member. A latch arm is provided for releasing the adjustment means. The latch arm has a latch element and a mounting aperture for receiving the latch arm pivot member of the lower plate member. The latch arm is mounted in the latch receiving space in underlying relation to the pivot shaft with the pivot member projecting through the latch arm aperture. The latch arm is retained on the pivot member in the latch receiving space by the pivot shaft. Preferably the latch arm pivot member will include a freestanding upper end having a support saddle thereon. One of the pivot shafts has an intermediate portion thereon that is mounted in the support saddle to secure the latch arm on the pivot member.

BRIEF DESCRIPTION OF THE DRAWINGS

Referring to the drawings:

FIG. 8 is a side view of a modified form of the seat suspension wherein the tension of the support spring is adjustable; and FIG. 9 is a top view of the seat suspension similar to FIG. 2 but showing a modified form of the release latch;

FIG. 10 is an end view taken along line 10—10 of FIG. 9; and

FIG. 11 is a partial sectional view taken along line 11 of FIG. 10.

DESCRIPTION OF THE PREFERRED EMBODIMENT OF THE INVENTION

Figure 1:
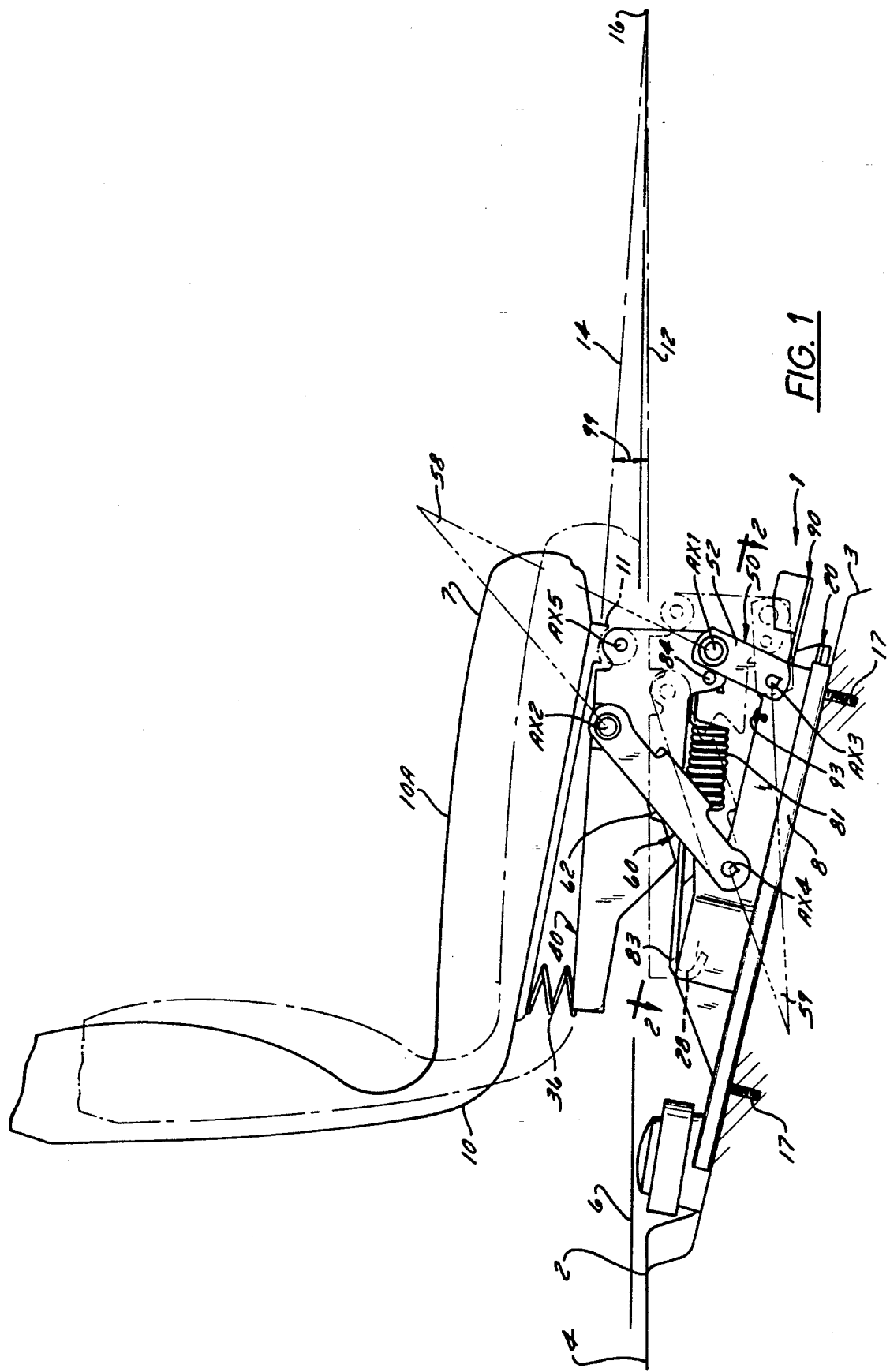
FIG. 1 is a side elevation view of the seat suspension constructed according to the present invention and showing an operator's seat mounted thereon.
Figure 1A:
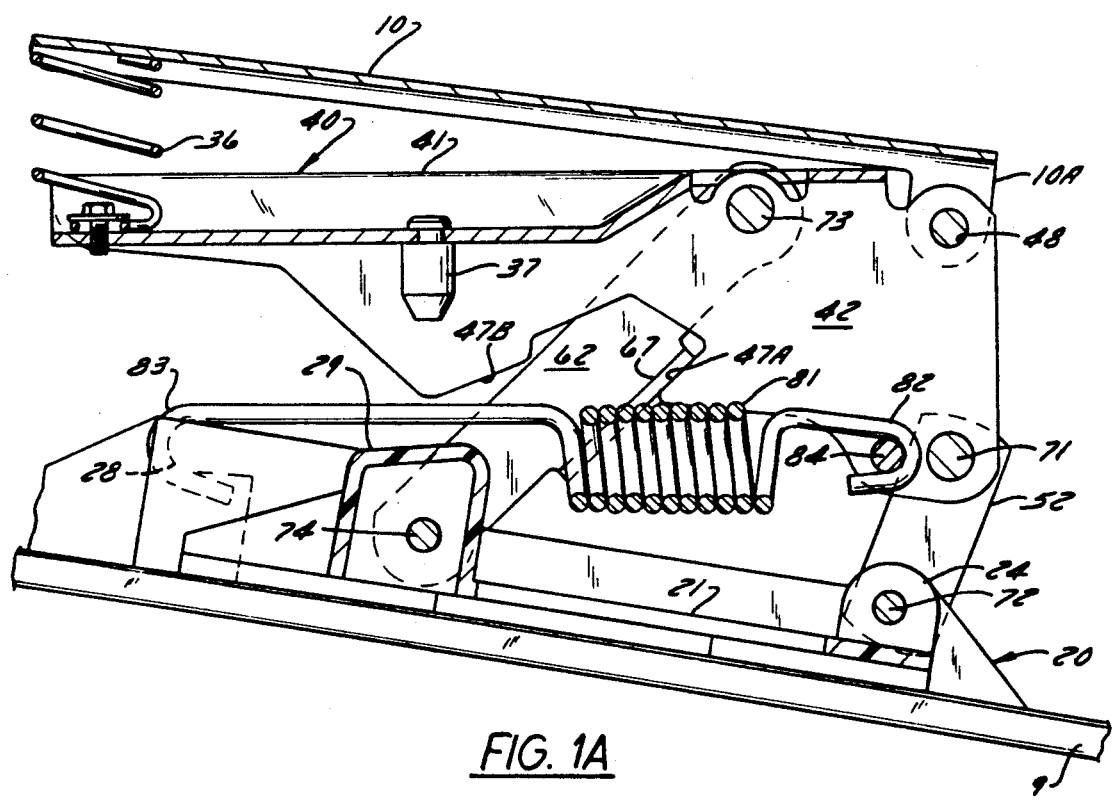
FIG. 1A is a partial enlarged side elevation view, partially in section, of the seat suspension shown in FIG. 1.

Referring to the drawings, FIGS. 1 and 1A show the seat suspension 1 on a vehicle 2 having front and rear ends 3 and 4 and a horizontal plane of reference 6. The seat suspension 1 supports a seat 7 having a pan 10, a cushion 10A and transversely spaced mounting flanges 11. The seat 7 and its suspension 1 is movable as a unit horizontally toward and away from the front end 3 of the vehicle along a releasable front to rear adjustment means which includes track members 8, 9 secured to vehicle 2 by threaded studs 17 as will be more fully described hereinafter.

The seat suspension 1 also permits the seat 7 to move up and down in vertical directions between a lower position lying in a lower plane of reference 12 and an upper position lying in an upper plane of reference 14.

Referring to FIGS. 1-5, the seat suspension 1 includes a base part 20 and a seat support part 40 positioned vertically thereabove and interconnected by front and rear link means 50 and 60. The base part 20 has a lower base plate 21; spaced apart rail members 22, 23 which are slidably received on tracks 8 and 9; lower front and rear fixed pivot axes AX3, AX4; a latch arm pivot member 27; transversely spaced apart rear end spring anchors 28 and a bumper 29. Preferably the base part 20 will be a one-piece member molded out of high impact strength material such as plastic with the lower front and rear pivot axes defined by the front and rear boss members 24, 26 integrally molded therein. The pivot member 27 extends vertically from the base plate 21 and terminates at an upper free end having a bearing saddle 32 thereon to receive shaft 74. A latch arm receiving notch or gap 33 (FIG. 4) is provided in the front end of base plate 21.

Figure 3:
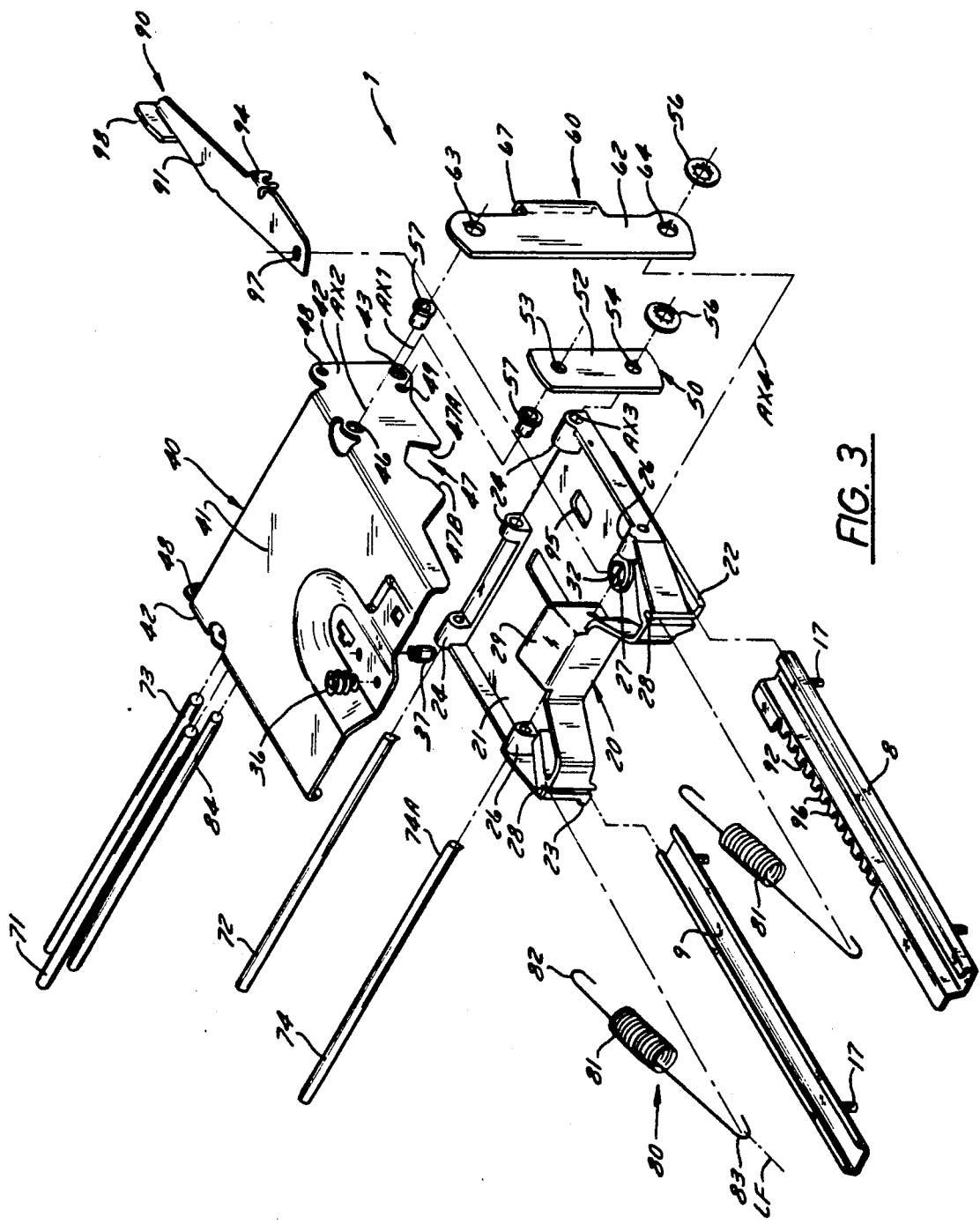
FIG. 3 is an exploded isometric projection view of the seat suspension shown in FIG. 1.
Figure 6:
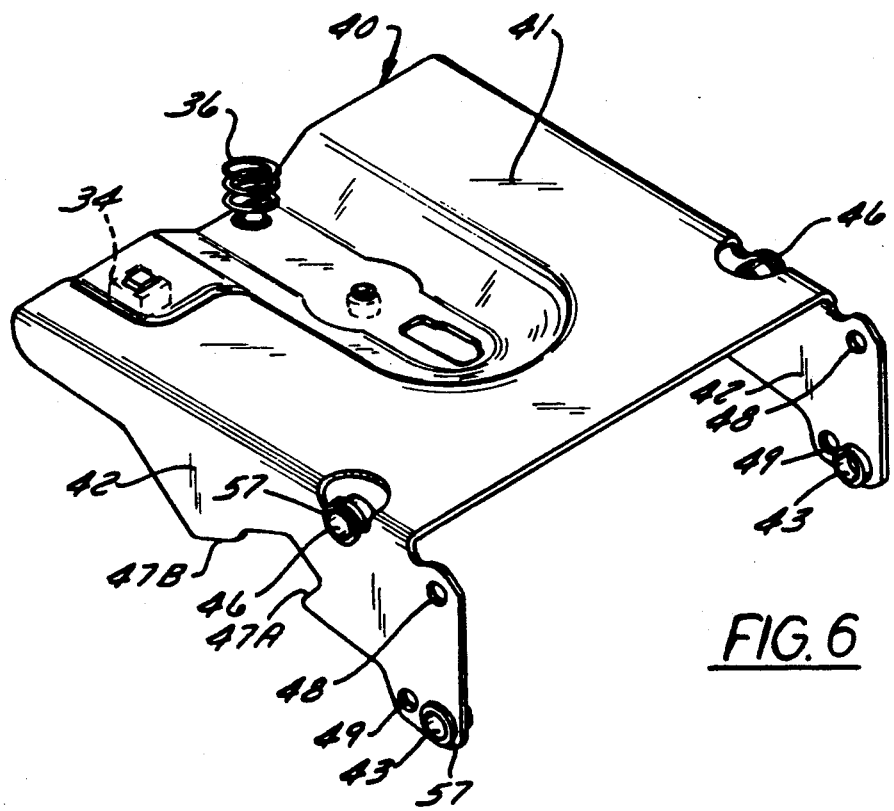
FIG. 6 is an enlarged isometric projection view of the seat support part of the seat suspension shown in FIG. 3.
Figure 7:
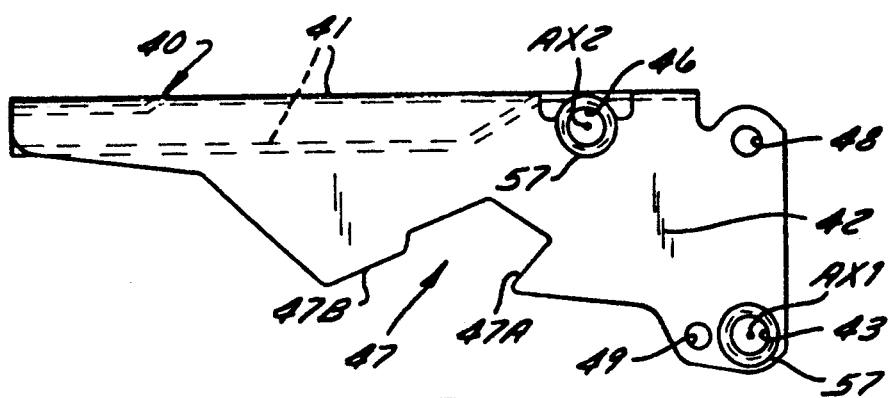
FIG. 7 is a side view of the seat support part shown in FIG. 8.

Referring to FIGS. 3, 6 and 7, the support part 40 has an upper plate 41; spaced apart parallel depending side plates 42; upper front and rear fixed pivot axes AX1, AX2 vertically spaced from each other relative to the horizontal plane of reference 6; a seat pan spring 36 for keeping the seat pan 10 out of engagement with a deadman switch 34 (FIG. 6); and a buffer 37 contactable with bumper 29 on the base part 20.

The side plates 42 each have an abutment means 47 comprising spaced apart front and rear abutments 47A, 47B; transversely spaced apertures 48 on which the seat pan 10 is pivotally secured; vertically spaced apertures 43, 46 coaxial with axes AX1 and AX2 and apertures 49 in which a spring mounting shaft 84 is secured.

The front link means 50 comprises a pair of transversely spaced front links 52 each of which has front upper and lower apertures 53, 54. Similarly the rear link means 60 comprises a pair of transversely spaced rear links 62 each having rear upper and lower apertures 63, 64. Each rear link 62 includes a stop element 67 in the form of a flange extending inwardly for contact with abutments 47A and 47B of the side plates 42 adjacent thereto when the suspension is in operation. The rear links 62 have a greater length between apertures 63, 64 than front links 52 have between their apertures 53, 54.

The front link 52 is pivotally interconnected between the front upper and lower axes AX1, AX3 by front upper and lower pivot shafts 71, 72. The outer ends of shafts 71, 72 are nonrotatably mounted in the apertures 53, 54 of links 52 by any suitable means such as welding or push-type grip nuts 56 or a combination thereof. Preferably the end peripheries of upper front shaft 71 adjacent links 52 will be rotatably supported in bushings 57 mounted in side plate apertures 43. The rear link 62 is pivotally interconnected in similar manner between the rear upper and lower pivot axes AX2, AX4 by rear upper and lower pivot shafts 73, 74 and nonrotatably held thereon by welding or push-type grip nuts 56. If grip nuts 56 are used, the ends of the shafts and the apertures in which they fit should be keyed to provide the nonrotatable mounting. Preferably each end periphery of upper rear shaft 73 will also be rotatably supported in bushings 57 mounted in apertures 46. As shown in FIG. 1, the front and rear links 52, 62 are dimensioned and the pivot axes AX1-AX4 therefore oriented so that the front and rear links 52, 62 will form an included acute angle 58 (FIG. 1) having its apex at the upper front of the seat suspension 1 when the seat is in its upper position and an included acute angle 59 having its apex at the lower rear of the seat suspension 1 when the seat is in its lower position as shown in FIG. 1. The linkage as described permits the front and rear links 52, 62 to pivot about upper front and rear axes AX1, AX2 and lower front and rear axes AX3 and AX4 defined by shafts 71, 73 and 72, 74, respectively, to constantly vary the attitude of the seating surface of seat cushion 10A.

A spring means 80, best shown in FIG. 3, comprises a pair of transversely spaced tension springs 81 interconnected between base part 20 and seat support part 40. Each tension spring 81 has a front end 82 and a rear end 83. The rear end 83 of each spring is secured in its respective rear spring anchor point 28 on base part 20. The front end 82 of each spring is secured to a front spring anchor shaft 84 connected between the transversely spaced side plates 42. The axis AX5 of shaft 84 is located so that the line of force LF of spring 81 will lie intermediate the vertically spaced lower base part 20 and the upper seat support part 40. The spring mounting points 28 and 84 provide a line of force LF that is substantially parallel to the horizontal plane of reference 6 when the seat is in its upper position, and that traverses across the rear links 62 and between the upper front and rear pivot axes AX1 and AX2.

Referring to FIG. 1, the forward ends of each seat pan flange means 11 is pivotally secured to seat support part 40 for rotation about an axis AX5. This permits seat pan 10 and seat 10A to be pivoted clockwise as a unit to a forwardly inclined position, not shown, to shed water.

Figure 2:
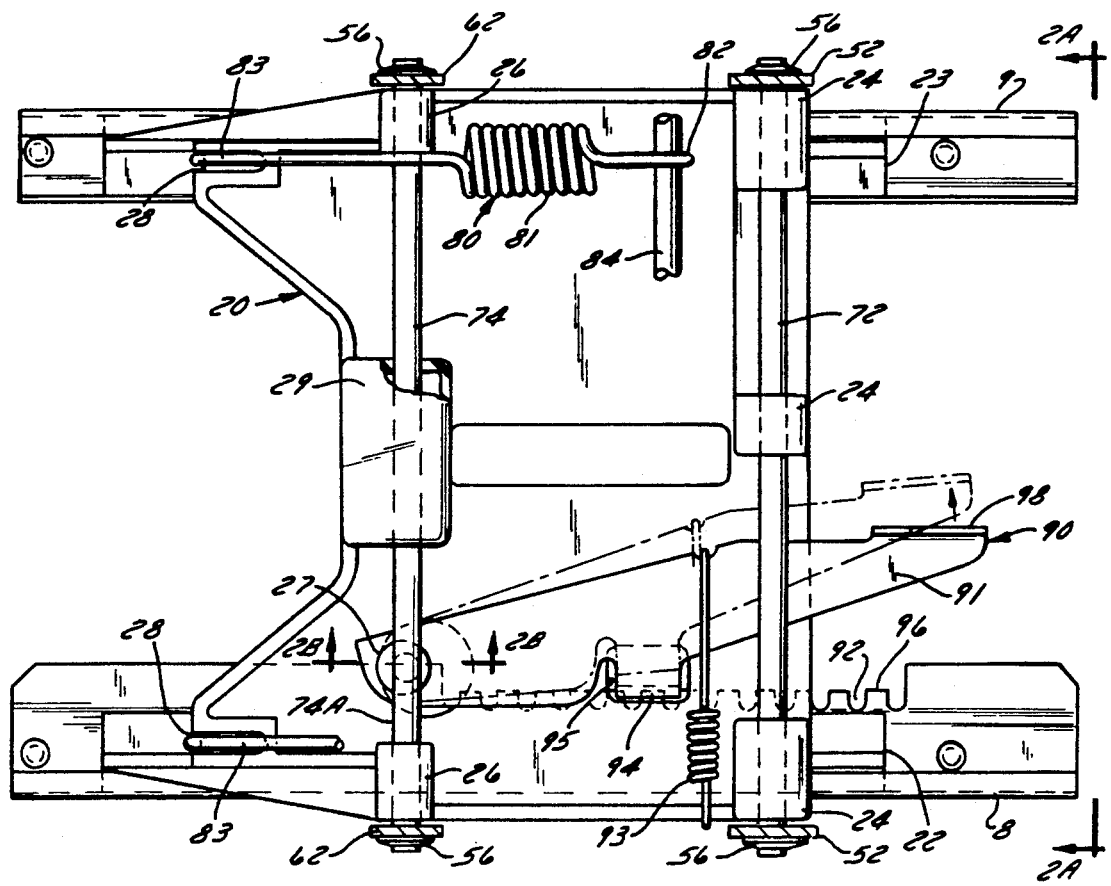
FIG. 2 is a top view of the seat suspension taken along line 2—2 of FIG. 1.
Figure 2B:
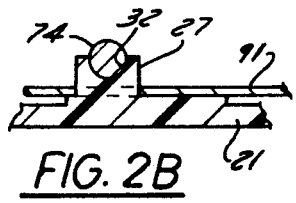
FIG. 2B is a section view taken along line 2B—2B of FIG. 2.
Figure 2A:
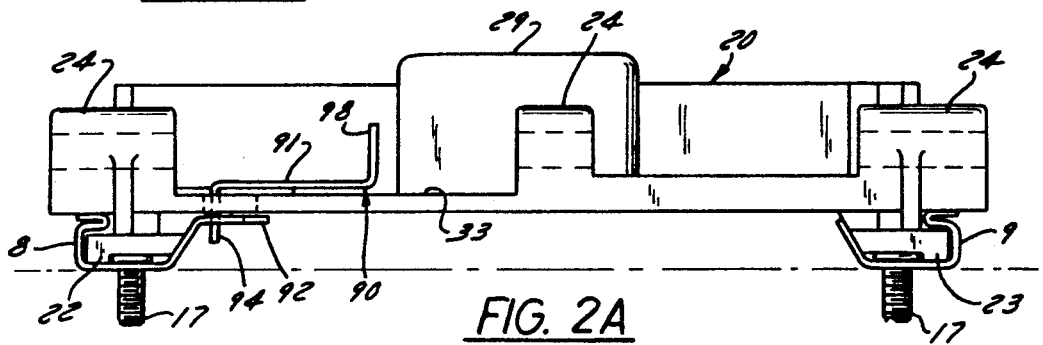
FIG. 2A is an end elevation of the seat suspension taken along line 2A—2A of FIG. 2.
Figure 4:
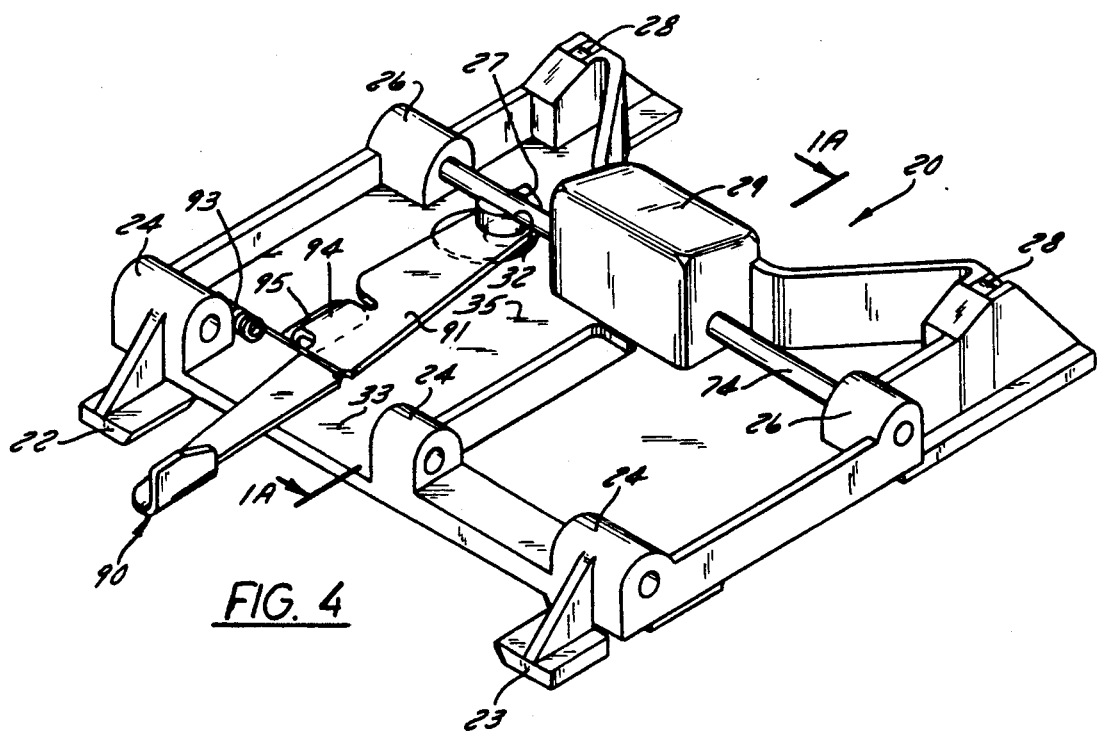
FIG. 4 is an enlarged isometric projection view of the base part of the seat suspension shown in FIG. 3.
Figure 5:
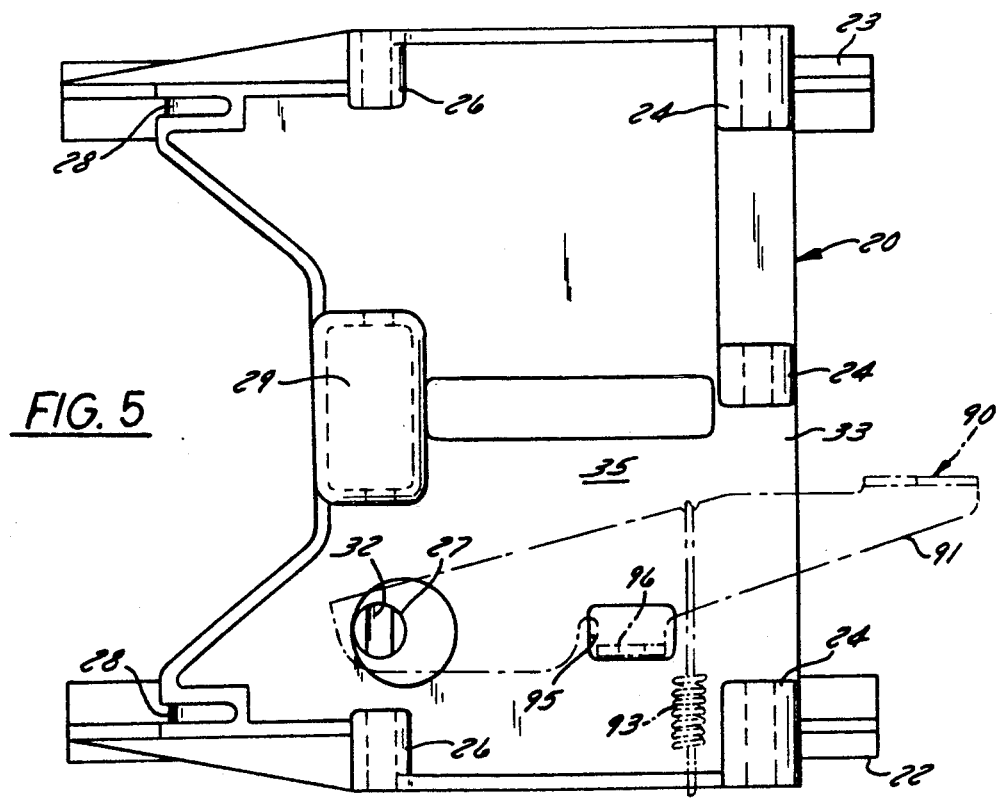
FIG. 5 is a top view of the base part shown in FIG. 4.

The seat suspension rails 22, 23 of base part 20 are slidably mounted on tracks 8 and 9, respectively. In order to releasably retain the seat 7 in any desired position of front to rear adjustment, the seat suspension includes a releasable latch means that coacts with a latch rack 92 on track 8. Two forms of the releasable latch means 90 are disclosed. FIGS. 2-4 show a first form 90 of the releasable latch means and FIGS. 9-11 show a second form 90A of the releasable latch means.

The first form 90 of the latch means is best shown in FIGS. 2-4 and comprises latch level 91 and a biasing spring 93. The latch lever 91 has a depending latch element 94 which passes through opening 95 in base plate 21 and into transversely releasable engagement with teeth 96 on rack 92; a mounting aperture 97 (FIG. 3) at one end thereof; and a handle portion 98 at the other end. The latch lever 91 is mounted on the lower plate 21 of base 20 with the latch arm pivot member 27 passing through aperture 97 and the handle portion passing outward through notch 33.

In assembly of the suspension system, the latch lever 91 is first installed on the pivot member 27 and the front and rear lower pivot shafts 72, 74 are then passed through bosses 24 and 26 which space the shafts above plate 21 a sufficient distance to provide a latch securing space 35 (FIG. 4) in which the latch lever 91 can be loosely received between the pivot shafts and the lower plate. The latch lever 91 is prevented from moving off of the pivot member 27 by the overlying pivot shafts. Preferably the rear lower pivot shaft 74 will have an intermediate portion 74A that will lie in the saddle 32 on pivot member 27 and the front shaft 72 will overlie the handle portion 98 of latch lever 91. However it is only necessary that at least one of the shafts 72, 74 cross over the latch lever arm to retain it in place. The latch lever pivots about pivot member 27 to move the latch element 94 into and out of engagement with the track teeth 96 to hold the base part 20 in any selected front to rear position. The latch spring 93 biases the latch lever 91 clockwise to keep the latch element 94 in engagement with teeth 96. When it is desired to move the seat forward or rearward, the latch lever 91 is moved counterclockwise to disengage the latch element 94 from teeth 96 which frees the rails 22, 23 to slide in tracks 8 and 9.

The latch lever mounting system just described reduces the number of parts in the latch means to just two; latch arm 91 and spring 93 to reduce manufacturing costs. Assembly costs are reduced because the pivot shafts 72, 74 perform a dual function. The shafts 72, 74 provide the necessary pivot axes AX3 and AX4, and, in addition, their installation automatically retains the latch lever 91 in place thus reducing assembly time and costs to an absolute minimum.

The second form 90A of the latch means is best shown in FIGS. 9-11 and comprises a latch lever 91A, a biasing spring 93A, and a retainer clip 101. The latch lever 91A has a depending latch element 94A which passes through opening 95A in base plate 21A and into vertical releasable engagement with teeth 96 on rack 92; a mounting aperture 97A at one end thereof; and a handle portion 98A at the other end. The latch lever 91A is mounted on the lower plate 21A with the latch arm pivot member 27A passing through aperture 97A and the handle portion extending forward of the lower plate 21A. Preferably the plate 21A will include a raised fulcrum in the form of a rib 105 adjacent pivot member 27A which supports the end of latch lever 91A for vertical rocking movement when the lever is moved in the direction of arrow 91B in FIG. 11.

In assembly, the latch lever 91A is first installed on pivot member 27A and the pivot shafts 72, 74 passed through bosses 24, 26. The latch lever 91 is held on pivot member 27A by shaft 74. The retainer clip 101 is then passed through opening 102 in plate 21A, through biasing spring 93A, and through an opening 103 in latch lever 91A. The retainer clip 101 has an up-stop end 104 adapted to engage the upper surface of latch lever 91A. The retainer clip is held in place on plate 21A by any suitable fastening means such as cap screws 106 with the spring 93A trapped between the plate 21A and the inner surface of the latch lever 91A. Spring 93A keeps the latch element 94A constantly engaged with teeth 96. When the latch lever is pushed downward in the direction of arrow 91B against the bias of spring 93A, the latch element 94A is moved downward away from engagement with the teeth 96, as shown in FIG. 11, and this releases the seat for fore and aft sliding on tracks 8 and 9.

A second embodiment of the seat is shown in FIG. 8 wherein the position of the anchor points of the front ends 82 of springs 81 are adjustable to vary the effective length of the lever arm on which the springs operate. The seat suspension of the second embodiment is the same as that of the first embodiment in all other respects and therefore no further description of the structure of the second embodiment will be made other than that relating to the adjustable spring anchor point. In the second embodiment, the seat assembly is provided with an adjustable spring anchor mounting plate 86 having detents 87. The front ends 82 of springs 81 are secured to plate 86. The forward end 85 of each side plate 42 is arcuate in shape and has a plurality of detent receiving notches 88 therein. The plate 86 has an actuating handle which is used to move the plate 86 along the arcuate path of plate end 85 to place detents 87 into any one of the notches 88 to vary the effective force exerted by springs 81. By adjusting the effective force, the float responsiveness of the seat suspension can be adjusted to match the weight of the occupant.

When unoccupied the seat suspension 1 will be in the upper position, shown in FIG. 1, to present the seating surface of seat 7 in an inclined forward attitude lying in the upper plane of reference 14 ready to secure the occupant. When the seat 7 is occupied, the weight of the occupant will tension spring means 80 causing the seat 7 to assume an intermediate floating position between the lower and upper planes of reference 12, 14. As the vehicle 2 travels over uneven ground, the seat 7 will oscillate about apparent pivot 16 forward of the knees of the seat occupant maintaining the seating surface in supporting contact with the occupant's thighs to reduce stress. Further, any repetitive motion that does occur will take place in the occupant's knee joints with the thigh and leg in an unstressed condition due to the seat support. Therefore the occupant's legs are free to flex unstressed within the limits of included angle 99 defined by planes of reference 12 and 14 to minimize the effect of any repetitive motion.

What is claimed is:

1. A seat suspension for resiliently mounting a seat on a vehicle having a front, a rear and a horizontal plane of reference, said seat being free-floating vertically relative to said horizontal plane between an upper position lying in an upper plane of reference and a lower position lying in a lower plane of reference and comprising:
   a base part having lower front and rear pivot axes and a mounting means for securing said base part on the vehicle;
   a seat support part having upper front and rear pivot axes vertically spaced apart from each other;
   front and rear link means pivotally interconnected respectively, between said upper front and lower front pivot axes and said upper rear and lower rear pivot axes to secure said seat support part in vertically spaced overlying relation to said base part; and
   a biasing means having front and rear ends and a line of force, said biasing means located between said base part and seat support part with said rear end connected to one of said parts and said front end connected to the other of said parts to orientate said line of force to extend from said front to said rear substantially parallel to said horizontal plane of reference when said seat is in said upper position to minimize the overall height of said seat suspension and to permit said seat, when occupied, to free-float between said upper and lower positions.

2. The seat suspension according to claim 1 further comprising:
   said biasing means comprises an extension spring means;
   said seat support having a plurality of spaced apart spring anchor points intermediate said vertically spaced upper front and rear pivot axes; and
   a spring mounting means for removably securing said front end of said spring means in any one of said anchor points to vary the effective force of said spring means.

3. The seat suspension according to claim 1 wherein said biasing means comprises an extension spring means and said rear end of said spring means is directly mounted on said base part and said front end is directly mounted on said seat support part intermediate said vertically spaced upper front and rear pivot axes.

4. The seat suspension according to claim 1 wherein:
   said biasing means includes an extension spring means;
   one of said parts has a plurality of spring anchor positions intermediate said upper and lower pivot axis; and
   a spring mounted means is provided on the other of said parts for adjustably securing one end of said biasing means in any one of said anchor points to vary the effective force of said spring means.

5. A seat suspension for resiliently mounting a seat on a vehicle having a front, a rear and a horizontal plane of reference, said seat being movable vertically relative to said horizontal plane between an upper position lying in an upper plane of reference and a lower position lying in a lower plane of reference and comprising:
   a base part having lower front and rear pivot axes and a mounting means for securing said base part on the vehicle;
   a seat support having upper front and rear pivot axes vertically spaced apart from each other and a plurality of spaced apart spring anchor points intermediate said vertically spaced upper front and rear pivot axes;
   a seat mounted on said seat support part and having a seat attitude relative to said horizontal plane of reference;

front and rear link means pivotally interconnected respectively, between said upper front and lower front pivot axes and said upper rear and lower rear pivot axes to secure said seat support part in vertically spaced relation to said base part and to cause said upper and lower planes of reference to converge at an apparent pivot lying forward of said upper and lower front pivot axes and vary said seat attitude about said apparent pivot as said seat travels between said upper and lower positions;

a biasing means having front and rear ends, said rear end connected to one of said parts and said front end connected to the other of said parts to permit said seat, when occupied, to float between said upper and lower positions; and a spring mounting means for removably securing said front end of said spring means in any one of said anchor points to vary the effective force of said spring means.

6. The seat according to claim 5 wherein said seat support has an abutment means including spaced apart front and rear abutments; said rear link means has a stop element; said front abutment contactable with said stop element to define said upper position and said rear abutment contactable with said stop element to define said lower position.

7. The seat means according to claim 6 wherein
said seat support part includes an upper plate member having spaced apart side plates;
said abutment means is mounted on at least one of said seat support side plates; and
said stop element is mounted on said rear link means for contact with said abutment means.

8. The seat suspension according to claim 7 wherein said abutment means includes spaced apart front and rear abutments with said stop element lying therebetween and contactable with said front abutment to define said upper position and with said rear abutment to define said lower position.

9. The seat suspension according to claim 5 wherein
said seat support part includes spaced apart side plates each having a front edge, with said spring anchor points comprising a plurality of notches in said front edges; and
said spring mounting means comprises a front anchor member having detent means selectably positionable in any of said notches.

10. A seat suspension for resiliently mounting a seat on a vehicle having a front, a rear and a horizontal plane of reference, said seat being movable vertically relative to said horizontal plane between an upper position lying in an upper plane of reference and a lower position lying in a lower plane of reference and comprising:

a base part having lower front and rear pivot axes and a mounting means for securing said base part on the vehicle;

a seat support part having upper front and rear pivot axes vertically spaced apart from each other;

a seat mounted on said seat support part;

front and rear link means pivotally interconnected respectively, between said upper front and lower front pivot axes and said upper rear and lower rear pivot axes to secure said seat support part in vertically spaced relation to said base part;

a biasing means having front and rear ends, said rear end connected to one of said parts and said front end connected to the other of said parts to permit said seat, when occupied, to free-float between said upper and lower positions; and said base part including a lower base member having a releasable front and rear position adjustment means permitting front to rear movement of said base part and a latch arm pivot member;

said lower front and rear pivot axes including lower front and rear pivot shafts, at least one of said pivot shafts positioned above said lower base member to define a latch arm receiving space between said shaft and lower base member;

a latch arm for releasing said adjustment means and having a latch element and a mounting aperture for receiving said pivot member therethrough to rotatably mount said latch arm in said latch receiving space in underlying relation to said one pivot shaft; and said latch arm being retaining on said pivot member in said latch receiving space by said one pivot shaft.

11. The seat suspension according to claim 10 wherein
said latch arm pivot member includes a freestanding upper end having a support saddle; and
one of said pivot shafts has an intermediate portion thereof that is mounted in said support saddle to secure said latch arm on said pivot member.

* * * * *